US010436901B2

(12) United States Patent  
Baldischweiler et al.

(10) Patent No.: US 10,436,901 B2  
(45) Date of Patent: Oct. 8, 2019

(54) OPTOELECTRONIC SENSOR AND METHOD FOR DETECTING OBJECTS

(71) Applicant: SICK AG, Waldkirch (DE)

(72) Inventors: Boris Baldischweiler, Waldkirch (DE); Olaf Steinborn, Waldkirch (DE)

(73) Assignee: SICK AG, Waldkirch (DE)

( * ) Notice: Subject to any disclaimer, the term of this patent is extended or adjusted under 35 U.S.C. 154(b) by 353 days.

(21) Appl. No.: 15/423,075

(22) Filed: Feb. 2, 2017

(65) Prior Publication Data

US 2017/0219706 A1    Aug. 3, 2017

(30) Foreign Application Priority Data

Feb. 3, 2016 (EP) .................................... 16154025

(51) Int. Cl.
| | |
|---|---|
| *G01S 17/02* | (2006.01) |
| *G01S 7/481* | (2006.01) |
| *G01S 17/08* | (2006.01) |
| *G01S 17/42* | (2006.01) |
| *G01S 7/497* | (2006.01) |
| *G01S 7/51* | (2006.01) |

(52) U.S. Cl.
CPC .......... *G01S 17/026* (2013.01); *G01S 7/4817* (2013.01); *G01S 7/4972* (2013.01); *G01S 7/51* (2013.01); *G01S 17/08* (2013.01); *G01S 17/42* (2013.01)

(58) Field of Classification Search
CPC ...... G01S 17/026; G01S 17/42; G01S 7/4817; G01S 7/51

See application file for complete search history.

(56) References Cited

U.S. PATENT DOCUMENTS

| 5,960,551 A * | 10/1999 | Nishi ................... G01C 15/004 |
| | | 33/292 |
| 8,638,446 B2 | 1/2014 | Briggs |
| 9,282,301 B1 * | 3/2016 | Cederlof ............. H04N 9/3147 |

(Continued)

FOREIGN PATENT DOCUMENTS

| DE | 43 40 756 A1 | 6/1994 |
| DE | 20 2009 012 589 U1 | 3/2011 |
| EP | 2 530 485 A1 | 5/2012 |

OTHER PUBLICATIONS

Search Report dated Jul. 21, 2016 issued in corresponding to European Application No. 16 15 4025.

*Primary Examiner* — Eric L Bolda  
(74) *Attorney, Agent, or Firm* — Nath, Goldberg & Meyer; Jerald L. Meyer; Stanley N. Protigal

(57) ABSTRACT

An optoelectronic sensor (10), in particular a laser scanner, is provided having a light transmitter (12) for transmitting a scanning beam (16) into a monitored zone (20); having a light receiver (26) for generating a received signal from the scanning beam (22) remitted by objects in the monitored zone (20); having a movable deflection unit (18) for a periodical deflection of the scanning beam (16, 22) in order to scan the monitored zone (20) in the course of the movement; having an evaluation unit (34) that is configured to recognize whether there are objects in at least one detection field within the monitored zone (20) with reference to the received signal; and having a projector (42) for visualizing information of the sensor (10) in the monitored zone (20). In this respect, the projector (42) is configured to visualize the detection field.

18 Claims, 2 Drawing Sheets

(56) References Cited

U.S. PATENT DOCUMENTS

| | | |
|---|---|---|
| 2005/0052720 A1 | 3/2005 | Tetterington |
| 2012/0057174 A1 | 3/2012 | Briggs |
| 2013/0201292 A1* | 8/2013 | Walter ............... F16P 3/14 348/47 |
| 2013/0241761 A1* | 9/2013 | Cooper ............. G01S 7/4812 342/54 |
| 2015/0168954 A1* | 6/2015 | Hickerson ......... G01S 17/026 700/259 |
| 2016/0375592 A1* | 12/2016 | Szatmary ............. B25J 5/00 700/255 |
| 2018/0029641 A1* | 2/2018 | Solar ............. B62D 15/0275 |

* cited by examiner

OPTOELECTRONIC SENSOR AND METHOD FOR DETECTING OBJECTS

FIELD

The invention relates to an optoelectronic sensor, in particular to a laser scanner, and to a method for detecting objects in accordance with the preamble of claim 1 and claim 15 respectively.

BACKGROUND

In a laser scanner, a light beam generated by a laser periodically sweeps over a monitored zone with the help of a deflection unit. The light is remitted at objects in the monitored zone and is evaluated in the scanner. A conclusion is drawn on the angular location of the object from the angular position of the deflection unit and additionally on the distance of the object from the laser scanner from the time of flight while using the speed of light. The location of an object in the monitored zone is detected in two-dimensional polar coordinates using the angular data and the distance data. The positions of objects can thus be determined or their contour can be determined.

Laser scanners are used in safety technology for monitoring a danger source, such as a dangerous machine. Such a safety laser scanner is known from DE 43 40 756 A1. In this process, a protected field is monitored which may not be entered by operators during the operation of the machine. If the laser scanner recognizes an unauthorized intrusion into the protected field, for instance a leg of an operator, it triggers an emergency stop of the machine. Other intrusions into the protected field, for example by static machine parts, can be taught as permitted in advance.

Safety laser scanners have to work particularly reliably and must therefore satisfy high safety demands, for example the EN13849 standard for safety of machinery and the machinery standard EN1496 for electrosensitive protective equipment (ESPE). To satisfy these safety standards, a series of measures have to be taken such as a secure electronic evaluation by redundant, diverse electronics, functional monitoring or special monitoring of the contamination of optical components, in particular of a front lens.

A generalization of a protected field also for applications outside safety technology, for instance for automation technology, is called a detection field here. Detection fields are virtually defined part regions of the monitored zone of the laser scanner that are typically configured at the time of installation and evaluated at the run-time. The detection fields lay down which regions of the detected scenery are to be evaluated with respect to objects, with this possibly only relating to a specific time in each case and with the definition of the detection fields changing at a different time. The type of detection field determines which type of evaluation is to be carried out and which response an object intrusion into a detection field triggers. With the already addressed protected fields, an object intrusion results in a safety-directed shutdown. Warning fields are mostly disposed in front of protected fields and trigger an alarm without directly intervening in the system and should as a rule prevent a continuing intrusion into a protected field still in good time by the alarm. Automation fields are the general complementary term to protected fields and warning fields, that is they are not safety-directed, but are rather used, for example in the form of a functional field as a virtual switch, as a measurement field for determining volumes or for other measurements.

The configuration of detection fields, above all in the case of safety-related protected fields, is essential for a proper function of the laser scanner. Relatively few aids are nevertheless currently provided for the user. An input of the boundaries of the detection field typically takes place in the laser scanner or in configuration software. In this respect, the dimensions of the detection field have to be known and there is no feedback in the actual scenery except for laborious testing using a test bar. It is admittedly also known to mark the protected fields by adhesive tapes or by color surfaces. However, this does not excuse the user from providing that the regions thus marked are actually configured as detection fields in the laser scanner.

A laser scanner is inter alia known from DE 20 2009 012 589 U1 that transmits a visible light beam in the direction of an object detected in a protected zone. The check of the configured protected fields is thus facilitated; however, only a spot test is still respectively possible and there is no overall overview.

U.S. Pat. No. 8,638,446 discloses a laser scanner having an integrated projector that is able to project visible information onto an object located in the environment. This information includes, for example, images, CAD files or point clouds from scanner measurements. For example, a texture is thus projected over an object or over a virtual object in a planned or ideal configuration over the actual object. Neither a securing with the aid of protected fields nor a visualization of detection fields is provided.

US 2005/0052720 A1 deals with a laser projection system in which a laser beam can be guided in two dimensions with the aid of two rotating deflection mirrors arranged perpendicular with respect to one another. There is, however, no connection with laser scanners.

SUMMARY

It is therefore the object of the invention to simplify the dealing with detection fields in a laser scanner.

This object is satisfied by an optoelectronic sensor, in particular by a laser scanner, and by a method for detecting objects in accordance with claim 1 and claim 15 respectively. The sensor periodically guides a scanning beam of a light sensor through the monitored zone with the aid of a movable deflection unit and evaluates the received signal of a light receiver. The movable deflection unit is frequently a rotating mirror; however, a measuring head having a light transmitter and a light receiver can also rotate, for example. The sensor monitors one detection field or a plurality of detection fields for object intrusion by evaluating the received signal in an evaluation unit. The invention now starts from the basic idea of visualizing the detection fields in the monitored zone. A projector is provided for this purpose that knows the detection fields, for instance by a common access of the projector and the evaluation unit to a corresponding configuration memory or by a data connection or control connection between the projector and the evaluation unit. The visualization can mean that the total detection field is illuminated homogeneously or with a pattern. It is, however, also alternatively sufficient to represent the outer boundaries or only some striking regions such as corners or a center by dots, reticles or the like.

The invention has the advantage that the installation and controlling of detection fields is substantially facilitated. A major source of error additionally disappears because it can immediately be recognized where the detection fields are disposed and there can therefore not be any unnoticed discrepancies between the desired detection fields and the actual detection fields. Although the visualization is primarily intended for an initial configuration, it can also be useful to display the detection fields during operation, permanently or on request; for instance, so that persons in the working region of the laser scanner can more easily avoid unintentional intrusions into the detection field or can become accustomed to a new configuration.

The projector preferably has a rotating light source. The projection method is then similar to the scanning method of the laser scanner. A rotating light source is understood both as a self-physically moved light source and as a rotary movement of only the light beam with the aid of a rotating mirror. The light source is preferably a laser in the visible wavelength range.

The projector preferably has a tilt unit for setting the tilt of the light source. The projection is thereby variable in elevation. The possibly results in combination with a rotating light source to project any desired geometrical shapes in polar coordinates and thus detection fields of any desired form. The tilt can be achieved by tilting the light source itself, but also by tilting a mirror, in particular a rotating mirror, arranged downstream. A controllable micromirror (DLP, digital light processing) is suitable, for example.

A control unit of the projector is preferably configured to visualize the detection field by projection onto the floor. The floor provides an easily visible projection surface. Detection fields can thus be adapted particularly easily to danger sources or working regions.

The control unit is preferably configured for a calibration in which the height and/or tilt of the projector is determined. The control unit can calculate how the detection fields are projected in a suitable manner from their own perspective onto the floor from these parameters. Without a calibration, the values would have to be predefined, for example parameterized, or an imprecision arises when the detection fields are not configured at the level of the floor, which is practically always the case.

The projector preferably has a tilt sensor. The calibration to the actual tilt can thus take place at any time automatically without any intervention of the operator.

The projector preferably has a detector to determine the height of the projector. The height is thus also automatically detectable. A small detector is, for example, attached beneath the light source of the projector and the height is then triangulated with reference to the projection beam. An automatic calibration is then possible overall with a tilt sensor and a detector or with other detection means for the tilt and the height and no manual calibration is required.

The projector is preferably configured as an additional module. The projector is, for example, a separate attachment device. Calibration surfaces are then advantageous to bring the projector and the laser scanner into an exactly defined and known relative position. An advantage of an additional device is the possibility of retrofitting. In addition, only one service engineer or one person responsible for the plant can configure any desired number of laser scanners after one another using a single additional module.

The projector is preferably integrated into the sensor. The projector again preferably co-uses the deflection unit of the scanning beam. That is, the light source of the projector, for example, also rotates in a movable measurement head with the light transmitter and the light receiver of the scanning beam. Alternatively, the visible light beam of the projector is coupled at an angle with respect to the rotating mirror corresponding to the respectively desired tilt. An advantage of an integrated solution is that the drive of the deflection unit anyway already present can be used twice for the rotational movement of the projector.

The projector preferably has a plurality of rotating light sources having different wavelengths. The light sources again preferably have a mutual angular offset. New representation possibilities result through different wavelengths with which detection fields or parts thereof can be visualized in their own colors. A preferred embodiment shows different types of detection fields in their own colors, for instance warning fields in a different color than protected fields.

The sensor is preferably configured as a range finder in that the evaluation unit determines the time of flight between the transmission and the reception of the light signal and from this the distance of an object, and/or wherein an angle measurement unit is provided for detecting the angular position of the deflection unit. Complete two-dimensional polar coordinates are available via the distance and angular measurements and any desired detection fields can be defined by them in a monitored zone configured as a plane. This corresponds exactly with a projector that can likewise visualize any desired geometrical shapes in polar coordinates and can thus visualize all detection fields by rotating and tilting the light source.

The sensor is preferably configured as a safety light scanner and has a safety output (OSSD, output signal switching device), with the evaluation unit being configured to determine whether an object is located in a detection field configured as a protected field within the monitored zone in order thereupon to output a safety-directed shut-down signal via the safety output. In this technical safety aspect, the coincidence between desired and actual protected fields is particularly critical and their intuitive recognizability is therefore particularly helpful.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
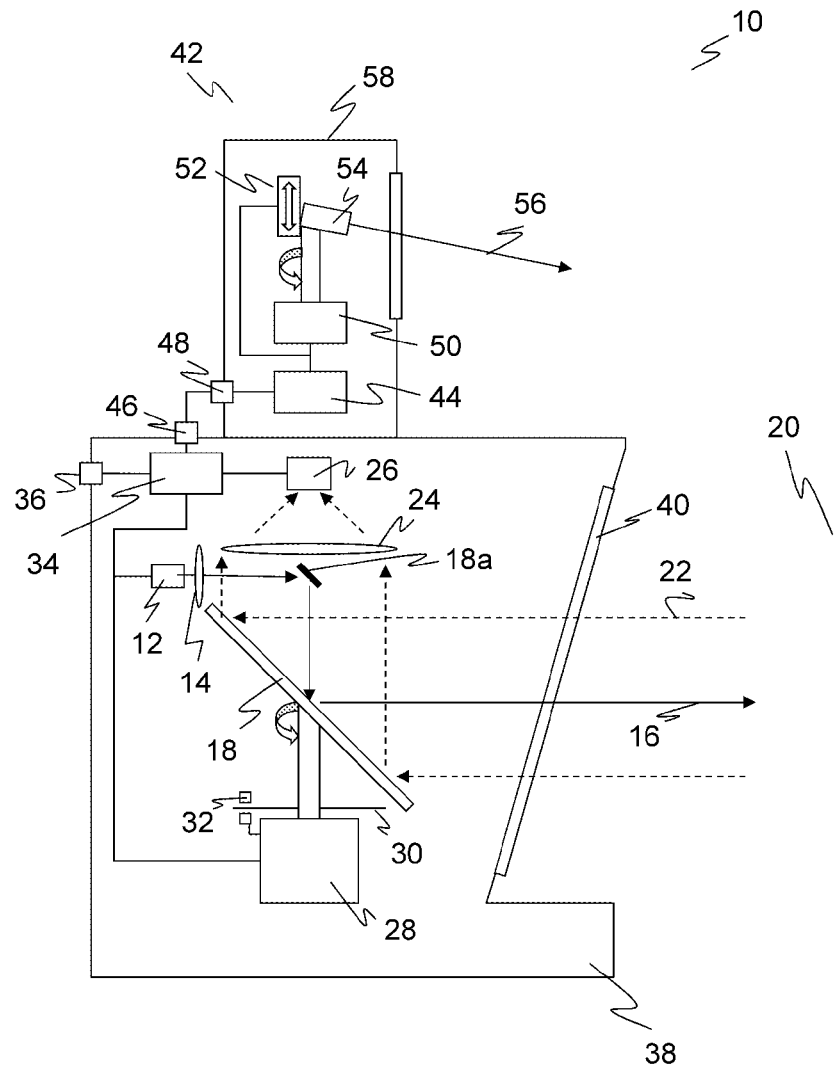
FIG. 1 a schematic sectional drawing of a laser scanner in accordance with the invention.

FIG. 1 shows a schematic sectional representation through a laser scanner 10. A light transmitter 12, for example having a laser light source, generates, with the aid of a transmission optics 14, a transmitted light beam 16 that is deflected via a mirror 18a at a movable deflection unit 18 into a monitored zone 20. If the transmitted light beam 16 is incident on an object in the monitored zone 20, remitted light 22 again moves back to the laser scanner 10 and is there detected via the deflection unit 18 and by means of a reception optics 24 by a light receiver 26, for example a photodiode or an APC (avalanche photodiode).

The deflection unit 18 is configured in this embodiment as a rotating mirror which rotates continuously by the drive of a motor 28. The respective angular position of the motor 28 or of the deflection unit 18 is recognized via an encoder which, for example, includes a code disk 30 and a forked light barrier 32. The light beam 16 generated by the light transmitter 12 thus sweeps over the monitored zone 20 generated by the rotational movement. Instead of a rotating mirror, it is also possible to configure the deflection unit 18 as a rotating optics head in which the light transmitter 12 and/or the light receiver 26, and possibly further elements, are accommodated. The coupling in via the mirror 18a and the design of the transmission optics 14 and reception optics 24 can also be varied, for instance via a beam-shaping mirror as a deflection unit, via a different arrangement of the lenses or via additional lenses. Laser scanners are in particular also known in a dual aperture arrangement having transmission and reception paths disposed next to one another.

If now remitted light 22 is received from the monitored zone 20 by the light receiver 26, a conclusion can be drawn on the angular position of the object in the monitored zone 20 from the angular position of the deflection unit 18 measured by the encoder 30, 32. In addition, the time of flight from the transmission of a light signal up to its reception after reflection at the object in the monitored zone 20 is preferably determined and a conclusion is drawn on the distance of the object from the laser scanner 10 using the speed of light.

This evaluation takes place in an evaluation unit 34 which is connected for this purpose to the light transmitter 12, to the light receiver 26, to the motor 28 and to the encoder 32. Two-dimensional polar coordinates of all objects in the monitored zone 20 are thus available via the angle and the distance. In a technical safety application, the evaluation unit 34 checks whether a non-permitted object intrudes into a protected zone fixed within the monitored zone 20. If this is the case, a securing signal is output via a safety output 36 (OSSD, output signal switching device) to a monitored source of danger, for example to a machine. The laser scanner 10 is a secure laser in such technical safety applications due to measures in accordance with the initially named standards. In other embodiments, instead of the safety output 36 or in addition thereto, an interface is provided for the outputting of measurement data or, for example, for parameterizing the laser scanner 10.

All the previously named functional components are arranged in a housing 38 which has a front screen 40 in the region of the light exit and of the light entry. The design of the housing 38 with a rear region without a front screen 40 is purely by way of example. In other embodiments, the front screen 40 covers the total 360° field of vision.

The protected field boundaries must be known to the evaluation unit 34 for the protected field monitoring. Although the example of protected fields is explained in the following, it also applies accordingly to other detection fields, that is in particular to warning fields or also to automation fields. The configuration of protected field boundaries takes place, for example, by parameterization or via software of an installation computer connected to the laser scanner 10.

In order to have the possibility of checking the set protected fields during the installation, but also during servicing work or in the later operation, the laser scanner 10 has a projector 42 with whose aid protected fields can be projected into the monitored zone 20. The projector preferably has its own control unit 44 that is connected to the evaluation unit 34 via connectors 46, 48. It is, however, also conceivable to integrate the function of the control unit 44 into the evaluation unit 34.

Although any projection technique is possible in principle, the projector 42 in the embodiment of FIG. 1 uses a projection light transmitter 54 that rotates by means of a motor 50 and whose tilt is adjustable by means of a tilt device 52, the projection light transmitter being, for example, a laser light source in the visible wavelength range having a projection optics, not shown. A visible projection light beam 56 is thereby transmitted into the monitored zone 20.

The projection light beam 56 rotates fast enough that a continuous circle becomes visible in the monitored zone 20 and in particular on the floor there. At the same time, the tilting is fast enough to vary the radius of the circles during the rotations and thus to draw the protected fields in polar coordinates overall.

Numerous variations of the projector 42 are possible. In the embodiment shown in FIG. 1, it is a plug-on device in its own housing 58. In this respect, the connection surfaces of the two housings 38, 58 are well-defined to provide an exact and known relative position in which the displayed and the monitored protected fields coincide. Adjustment screws or a different alignment aid via magnets are conceivable. Alternatively to a separate plug-on device, the projector 42 can, however, also be integrated into the housing 40 of the actual laser scanner, in particular also while co-using the motor 28 or even the deflection unit 18. For the projection light transmitter 54 does not itself have to rotate to generate a rotational movement, but can rather also utilize a rotating deflection unit for this purpose, and indeed both in the case of a separate plug-on device and on an integration into the housing 40.

The tilt unit 52 preferably likewise does not generate any direct movement of the projection light transmitter 54, although that is possible, but rather moves a mirror. It can be an additional mirror in the path of the projection light beam 56 or a mirror of the deflection unit. Controllable micromirrors (DLP, digital light processing) are particularly suitable.

Whereas in FIG. 1 the control unit 44 and the evaluation unit 34 have a direct connection via the connectors 46, 48, it is also conceivable first to read out the configuration data with the protected field boundaries, for example using a USB stick at a corresponding interface at the housing 38, and subsequently to input them into the projector 42. The configuration data can also be transferrable via a connected computer or via a higher-ranking control.

If protected fields are drawn on the floor, the control unit 44 must be aware of the position of the laser scanner 10, namely its height above the floor and its tilt. Otherwise substantial distortion would arise due to the projection because a projected field is configured well above the level of the floor in practice.

Figure 2:
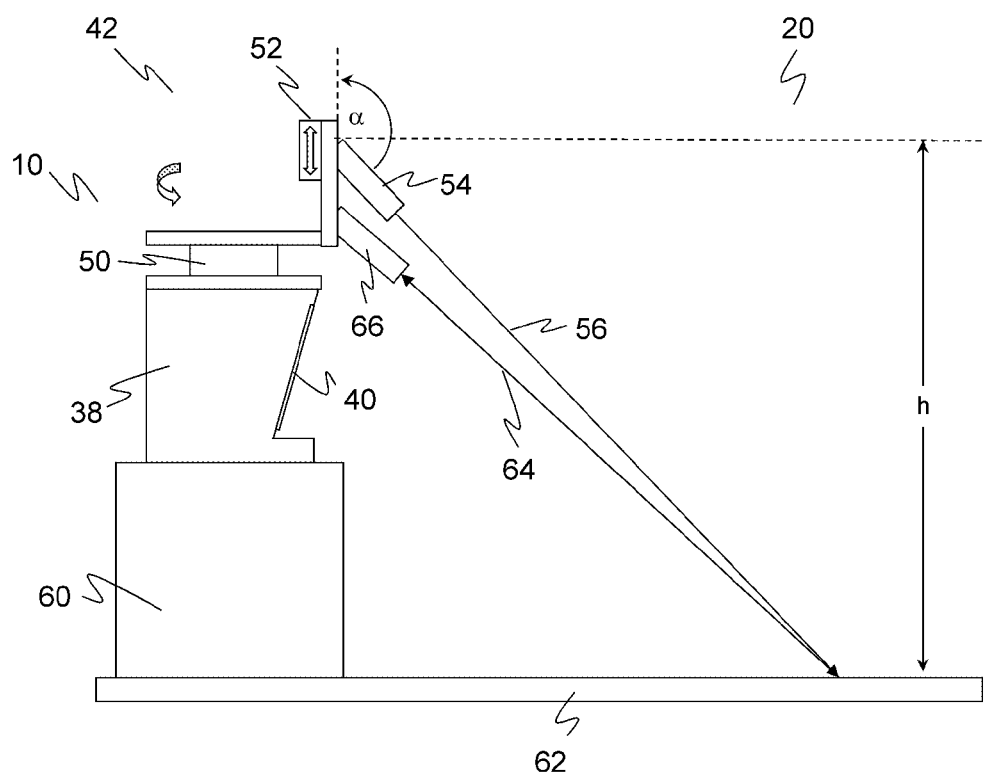
FIG. 2 a schematic representation of a laser scanner in an application environment to illustrate the projection of detection fields.

FIG. 2 shows a schematic representation of the laser scanner 10 in an application environment. In this respect, for reasons of clarity, only a small portion of the elements of the laser scanner are shown, but are then provided with the same reference numerals as in FIG. 1.

The laser scanner 10 stands on a base 60 at a specific height above the floor 62. The projector 42 generates the visible projection beam 56 that draws a dot when incident on the floor 62 and that draws the protected fields in the course of the superposed rotational and tilt movement by the motor 50 and by the tilt device 52. The scales in FIG. 2 only serve for explanation and are rather untypical since the laser scanner 10 is usually installed considerably higher and is small with respect to the distance and dimensions of the monitored zone 20 and of the protected fields.

The tilt angle α and the height h above the floor 62 should be known for the calibration of the projector 42. Tilt sensors, not shown, can be used for the determination of the tilt angle α, preferably in two axes from which then the tilt in all directions can be derived. This tilt is then compensated during the projection in the tilt angles of the tilt device 52.

The projector 42 can determine the height itself in a preferred embodiment. For this purpose, the projection light transmitter 54 is tilted with the aid of the tilt device 52 in a fixed angular position, that is with a stationary motor 50, for so long in a calibration step until the projection light beam 64 remitted at the floor 62 is incident onto a vertical measurement light receiver 66 attached beneath the projection light transmitter 54. The height h can be calculated from the tilt angle required for this constellation with knowledge of the previously determined tilt of the laser scanner 10 as well as with knowledge of the internal geometry, in particular of the spacing between the projection light transmitter 54 and the vertical measurement light receiver 66.

Only one respective projection light transmitter 54 is provided in the previously described embodiments. It is conceivable to use a plurality of light sources of different colors, preferably with a mutual angular offset. Specific protected fields or parts thereof can thereby be marked by different colors. It is also possible to display the type of a detection field; that is, for example, to display warning fields in blue and protected fields in red or yellow.

The projection of detection fields is particularly useful when a plurality of laser scanners 10 in accordance with the invention are installed together at a monitored zone. It can then immediately be seen where all the detection fields are. This can be associated with the participating laser scanners 10 by different colors and the common configuration can thus be substantially accelerated.

The invention is also suitable for mobile applications, for example in the securing of vehicles or AGVs (autonomous guided vehicles). It is particularly advantages in configuration and operation there if the detection fields that are in particular speed-adapted are displayed, for example to indicate the critical zone to persons from which they must keep away.

The invention claimed is:

1. An optoelectronic sensor comprising:
   a light transmitter for transmitting a scanning beam into a monitored zone;
   a light receiver for generating a received signal from the scanning beam remitted by objects in the monitored zone;
   a movable deflection unit for a periodical deflection of the scanning beam in order to scan the monitored zone in the course of the movement;
   an evaluation unit that is configured to recognize whether there are objects in at least one detection field within the monitored zone with reference to the received signal, the detection field being a virtually defined part region of the monitored zone; and
   a projector for providing visualization information of the sensor in the monitored zone, with the projector being configured to provide a visible display of the detection field, thereby providing a visible indication of the detection field in a display perspective onto the floor or other surface corresponding to a volume or area of the detection field above or below the surface.

2. The sensor in accordance with claim 1, wherein the sensor is a laser scanner.

3. The sensor in accordance with claim 1, wherein the projector has a rotating light source.

4. The sensor in accordance with claim 3, wherein the projector has a tilt unit for setting the tilt of the light source.

5. The sensor in accordance with claim 1, wherein the projector has a control unit that is configured to provide visualization of the detection field by projection onto the floor.

6. The sensor in accordance with claim 1, wherein the projector has a control unit that is configured for a calibration in which at least one of a height and/or a tilt of the projector is determined.

7. The sensor in accordance with claim 1, wherein the projector has a tilt device, providing a tilt sensor function.

8. The sensor in accordance with claim 1, wherein the projector has a detector to determine a height of the projector.

9. The sensor in accordance with claim 1, wherein the projector is configured as an additional module.

10. The sensor in accordance with claim 1, wherein the projector is integrated into the sensor.

11. The sensor in accordance with claim 1, wherein the projector has a plurality of rotating light sources having different wavelengths.

12. The sensor in accordance with claim 1, that is configured as a range finder in that the evaluation unit determines the time of flight between the transmission and the reception of the light signal and determines the distance of an object from the time of flight.

13. The sensor in accordance with claim 1, wherein an angle measurement unit is provided for detecting the angular position of the deflection unit.

14. The sensor in accordance with claim 1, that is configured as a safety light scanner and has a safety output, with the evaluation unit being configured to determine whether an object is located in a detection field configured as a protected field within the monitored zone in order thereupon to output a safety-directed shut-down signal via the safety output.

15. A method of detecting objects, the method comprising the steps of:
   transmitting a scanning beam into a monitored zone;
   generating a received signal from the scanning beam remitted by objects in the monitored zone; and
   periodically deflecting the scanning beam by a rotatable deflection unit in order to scan the monitored zone in the course of the movement; and
   recognizing, by evaluating the received signal, whether objects are located in a detection field within the monitored zone, with information providing visualization of the detection field in the monitored zone using a projector to provide a visible display of the detection field, thereby providing a visible indication of the detection field in a display perspective onto the floor or other surface corresponding to a volume or area of the detection field above or below the surface.

16. The method in accordance with claim 15, wherein the detection field in the monitored zone is projected onto the floor in that a visible light source of the projector rotates and said projector's tilt position is varied and activated in accordance with the boundaries of the detection field while taking account of the tilt and height of the projector.

17. The method in accordance with claim 16, wherein the projector calibrates itself to determine its tilt and height.

18. An optoelectronic sensor comprising
a light transmitter for transmitting a scanning beam into a monitored zone;
a light receiver for generating a received signal from the scanning beam remitted by objects in the monitored zone;
a movable deflection unit for a periodical deflection of the scanning beam in order to scan the monitored zone in the course of the movement;
a safety output;
an evaluation unit that is configured to recognize whether there are objects in at least one detection field within the monitored zone with reference to the received signal, and output a safety-related shut-down signal via the safety output, the detection field being a virtually defined part region of the monitored zone;
a projector for providing visualization information of the sensor in the monitored zone, with the projector being configured to provide a visible display of the detection field; and
a control unit, configured to provide the visualization information by projection onto the floor, the control unit providing calibration to determine at least one of a height and a tilt of the projector and calculate an approximate projection of the detection field on the floor from the perspective of the projector, thereby reducing distortion of the projected detection field in the case of the protected field configured at other than the height of the floor, and providing a visible indication of the detection field in a display perspective onto the floor or other surface corresponding to a volume or area of the detection field above or below the surface.

\* \* \* \* \*